US006938181B1

(12) United States Patent
Talagala et al.

(10) Patent No.: US 6,938,181 B1
(45) Date of Patent: Aug. 30, 2005

(54) FIELD REPLACEABLE STORAGE ARRAY

(75) Inventors: Nisha D. Talagala, Fremont, CA (US); Whay S. Lee, Newark, CA (US); Chia Y. Wu, Newark, CA (US); Marc T. Roskow, Los Gatos, CA (US); Fay Chong, Jr., Cupertino, CA (US); Randall D. Rettberg, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 582 days.

(21) Appl. No.: 09/721,064

(22) Filed: Nov. 21, 2000

(51) Int. Cl.[7] .............................................. G06F 11/00
(52) U.S. Cl. ........................ 714/7; 714/4; 312/222.1; 312/223.1
(58) Field of Search .................... 714/4, 7; 312/223.1, 312/222.1

(56) References Cited

U.S. PATENT DOCUMENTS

| | | | | |
|---|---|---|---|---|
| 4,602,164 A | * | 7/1986 | Gore et al. | 307/91 |
| 5,663,868 A | * | 9/1997 | Stalley | 361/695 |
| 5,682,509 A | * | 10/1997 | Kabenjian | 710/312 |
| 5,720,025 A | | 2/1998 | Wilkes et al. | |
| 5,742,792 A | * | 4/1998 | Yanai et al. | 711/162 |
| 5,812,754 A | * | 9/1998 | Lui et al. | 714/6 |
| 5,996,054 A | * | 11/1999 | Ledain et al. | 711/203 |
| 6,161,152 A | * | 12/2000 | Garg et al. | 710/46 |
| 6,230,190 B1 | * | 5/2001 | Edmonds et al. | 709/213 |
| 6,351,825 B1 | * | 2/2002 | Kaneda et al. | 714/27 |

OTHER PUBLICATIONS

Single Replaceable RAID system, iBM TDB Issue No. 449, Sep. 2001, pp 1563.*
Microsoft Computer Dictionary 3rd edition, 1997, pp 34.*

(Continued)

*Primary Examiner*—Robert Beausoliel
*Assistant Examiner*—Emerson Puente
(74) *Attorney, Agent, or Firm*—Robert C. Kowert; Meyertons, Hood, Kivlin, Kowert & Goetzel, P.C.

(57) ABSTRACT

A single field replaceable storage or computer system may include a processor coupled to a peripheral bus by a bridge device. The field replaceable unit (FRU) may also include system memory coupled to the processor and a network interface coupled to the peripheral bus. One or more drive controllers may also be included coupled to the peripheral bus. Additionally, the single field replaceable unit includes an array of disk drives coupled to the one or more drive controllers. The array of disk drives may be configured as one or more RAID logical volumes and exported or presented to client machines as one or more file systems through the network interface. The processor, system memory, network interface, drive controllers, and array of disk drives are all packaged together as a single field replaceable unit. The processor, system memory, network interface, drive controllers, and array of disk drives may be configured not to be individually field serviceable or replaceable. If the unit fails and needs servicing or replacement, the unit may be replaced as a whole.

31 Claims, 11 Drawing Sheets

OTHER PUBLICATIONS

Kevin Railsback, "RaQ a fine low-cost Websever alternative", Nov. 15, 1999, InfoWorld.com, vol. 21, Issue 46, pp. 1-3.*

Brian, Marshall, "How Web Servers Work", HowStuff Works.com pp 1-2.*

John Wilkes, Richard Golding, Carl Staelin, and Tim Sullivan, "The HP AutoRAID Hierarchical Storage System," ACM Transactions on Computer Systems, vol. 14, No. 1, Feb. 1996, 29 pages.

Stefan Savage and John Wilkes, "AFRAID-A Frequently Redundant Array of Independent Disks," 1996 USENIX Technical Conference—Jan. 22-26, 1996, pp. 27-39.

Sun Microsystems, Inc. "The Sun™ StorEdge™ A5000 Architecture Technical White Paper," Dec. 8, 1998, 32 pages.

Snap Server, "datasheets," http://www.snapserver.com/datasheets.html, Feb. 7, 2000, 5 pages.

* cited by examiner

FIELD REPLACEABLE STORAGE ARRAY

BACKGROUND OF THE INVENTION

1. Field of the Invention

This invention relates to computer storage and server systems, and more particularly to such systems providing multi-disk storage in a single, field replaceable unit.

2. Description of the Related Art

Many enterprises employ server or storage systems that include multiple disk drives and other components. These enterprises may require a high degree of reliability from their server and storage computer systems. If a component of the server or storage system fails, it may cause the entire system to fail or at least to operate in a degraded mode. Since many enterprises cannot afford extended down time from such component failures, it is desirable to be able to quickly address such component failures. One way this problem has been addressed is to make many of the components of such computer systems to be field replaceable or even hot swappable. Field replaceable means that a failed component may be easily replaced in the field with a new, functional component. For example, in many computer systems components such as the hard drives, power supplies, fans, and even CPU's may be field replaceable. Hot swappable refers to the ability to replace such a component without powering down the system. Ideally, hot swappable means that a component such as a hard drive can be removed and replaced with a new hard drive without powering down the system and the new drive will be automatically recognized by the system.

However, in order to support field replacement or hot swapping of components, the system must be designed to allow easy access to all components that are to be field replaceable or hot swappable. This requires that the system have access panels and other openings as necessary to allow access to the components that are to be field replaceable or hot swappable. In addition to access panels that may easily be opened in the field, the system must also be internally designed to allow access to the replaceable components. For example, the replaceable components should not be blocked by other components. Also, replaceable and hot swappable components are often mounted in a bracket or socket for easy removal and insertion. Special sockets may also be required for hot swappable devices to insure that hot removal or insertion does not interrupt ongoing transactions in the computer or storage system.

The access panels, internal spacing, special sockets, etc., required to support field replacement or hot swappability means that components may not be packaged as densely in such systems as would otherwise be possible. Also, the requirements to support field replacement and/or hot swappability may make a system more expensive. It would be desirable to still achieve some of the benefits of field replaceability without sacrificing the loss of component density and the added expense of current systems that support field replaceable components.

SUMMARY OF THE INVENTION

Conventional storage systems are typically designed to allow for replacement or hot swap for all essential components, such as disk drives, fans power supplies, etc. However, a computer or storage system may be provided with reduced or even no serviceable internal parts so that the entire device may become a field replaceable unit. Such a single system field replaceable unit may have a large storage capacity by containing multiple individual disk drives. Since there are no field replaceable or hot swappable parts, the field replaceable unit may have a storage density that is not possible with typical storage systems that support disk replacement and other component replacement.

In one embodiment, a storage system field replaceable unit may contain eight low profile ATA-type disk drives attached to a printed circuit motherboard. ATA-type disk drives refer to disk drives that conform to any variant of the AT Attachment specification, such as ATA-2, Fast ATA, ultra-ATA, ATA/66. Such drives may also be referred to as IDE or EIDE drives. Two local ATA controllers and two PCI expansion ATA controllers may be included on the motherboard and used to control the eight ATA disk drives. A series of fans may also be included within the unit positioned between the motherboard and the ATA drives. In one embodiment, each ATA drive may be a 34 gigabyte drive so that the capacity of the field replaceable storage system is approximately 250 gigabytes.

Software running on the field replaceable storage system exports or presents the disk storage as an NFS or CIFS file system that may be mounted by client machines on a network. In one implementation, the field replaceable storage system runs the Solaris® operating system internally and uses the DiskSuite software to organize the disk drives into RAID logical volumes. File systems are then built on these logical volumes and exported or presented to client machines using either NFS for Unix clients or a program, such as Samba, for Windows clients. In another implementation the field replaceable storage system runs the Linux operating system internally using the Linux multi-device management software to configure RAID volumes. These volumes may be exported or presented to client machines in the same was as in the Solaris implementation.

A single field replaceable storage or computer system may include a processor coupled to a peripheral bus by a bridge device. The field replaceable unit (FRU) may also include system memory coupled to the processor and a network interface coupled to the peripheral bus. One or more drive controllers may also be included coupled to the peripheral bus. Additionally, the single field replaceable unit includes an array of disk drives coupled to the one or more drive controllers. The array of disk drives may be configured as one or more RAID logical volumes and exported or presented to client machines as one or more file systems through the network interface. The processor, system memory, network interface, drive controllers, and array of disk drives are all assembled together as a single field replaceable unit. The processor, system memory, network interface, drive controllers, and array of disk drives may be configured not to be individually field serviceable or replaceable. If the unit fails and needs servicing or replacement, the unit may be replaced as a whole.

The single field replaceable unit may also include a motherboard, wherein the processor, system memory, network interface, one or more drive controllers, and array disk drives are all attached to the motherboard so as not be field removable. The field replaceable unit may also include one or more fans configured to flow air over the array of disk drives and the processor, wherein the fans are also not individually field serviceable or field replaceable. The fans may be positioned in a row between the array of disk drives and the processor.

In one embodiment, the one or more drive controllers may include four ATA-type drive interfaces and the array of disk drives may include eight ATA-type disk drives, two per interface. Alternatively, a fewer number of ATA-type drive controllers may be used in conjunction with a switch that expands the number of ATA drives that may be connected to a single ATA port. For further information on such an ATA device expansion switch, see co-pending U.S. patent application Ser. No. 09/624,557, titled "Switch for Selectively Forming a Communication Channel Between a Processing Unit and Multiple Devices, and Associated Data Exchange Methods", filed Jul. 25, 2000, inventor Whay S. Lee, which is herein incorporated by reference in its entirety.

The single field replaceable unit may also include a power supply configured to provide power to the processor, system memory, network interface, one or more drive controllers, and array of disk drives. The power supply is part of the field replaceable unit and not individually field serviceable or replaceable. The field replaceable unit may be configured to be coupled to a network and accessed by one or more client machines so that the client machines have access to the one or more file systems provided by the array of disk drives within the single field replaceable unit. Also, the field replaceable storage system unit may be configured as a RAID system and may provide storage for at least a quarter of a terabyte of data. Furthermore the field replaceable unit may be configured to provide office network services including issuing IP addresses to the client machines, web page server services, electronic mail services, etc. The field replaceable units may be designed to be mounted in a storage rack, such as an industrial 19 inch computer equipment rack.

A method for providing computing resources may include assembling a processor, network interface and array of disk drives as a single field replaceable unit so that the components of the field replaceable unit are configured not to be individually field serviceable or replaceable. The processor, network interface, and array of disk drives may be configured to provide one or more file systems to client machines through the network interface. The method for providing computing resources may further include preinstalling software on the single field replaceable unit configurable to organize the array of disk drives into one or more RAID logical volumes to be exported or presented to client machines as one or more file systems through the network interface. After packaging the components into the field replaceable unit and preinstalling software, the unit may be shipped to a user. If necessary, the single field replaceable unit is replaced as a whole upon failure. The storage capacity of the single field replaceable unit is not individually upgradeable by adding additional drives. Therefore, the method for providing computing resources may include upgrading the computer resources by the user installing one or more additional ones of the field replaceable unit.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1:
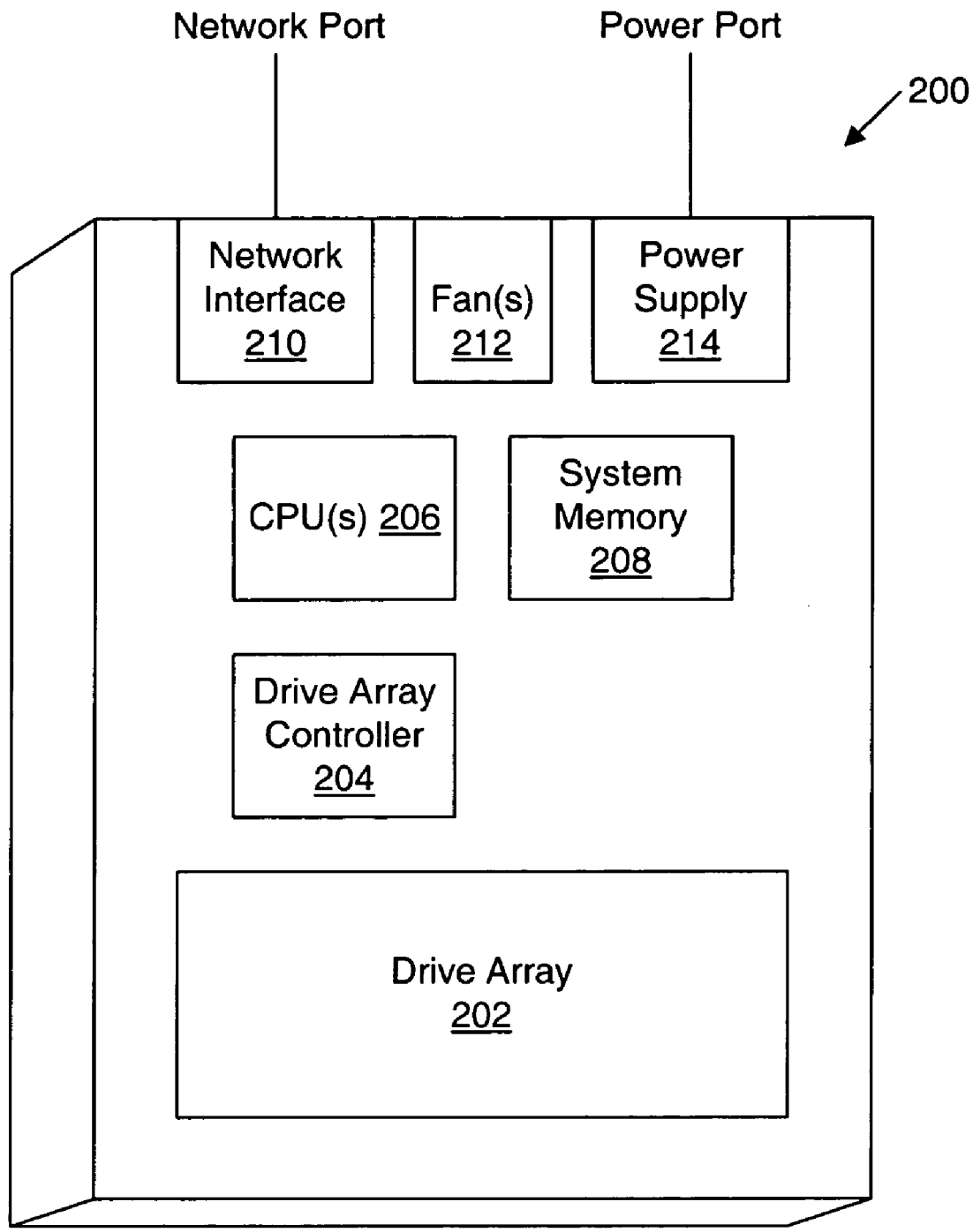
FIG. 1 is an illustration of a computer of storage system including multiple hard drives and configured as a single field replaceable unit, according to one embodiment.

Conventional storage systems are typically designed to allow for replacement or hot swapping of most essential components, such as disk drives, fans, power supplies, etc. In contrast, FIG. 1 illustrates a storage system 200 assembled as a field replaceable unit, according to one embodiment. The entire system 200 may be a single field replaceable unit (FRU). Storage system 200 may include multiple individual disk drives to provide a large storage capacity which is implemented as a single field replaceable unit. Since there are no or a reduced number of field replaceable or hot swappable internal parts, storage system 200 may have a storage density that is not possible with storage systems that support field or hot replacement of components, such as disk drives.

Storage system 200 includes a drive array 202. Drive array 202 may include multiple hard disk drives. Each hard disk drive is configured within system 202 so as not to be individually replaceable in the field. Thus, the drives of disk array 202 may be packaged much more densely within system 200 than in conventional systems supporting field replacement. In one embodiment, drive array 202 include eight low profile ATA-type disk drives. The drives may be attached to a PC motherboard. In other embodiments, drive array 202 may include multiple hard drives designed for interface to SCSI, fibre channel, or other interconnect architectures. Drive array 202 may be coupled to one or more drive array controllers 204. In one embodiment, drive array controller 204 includes four ATA drive controllers supporting two ATA-type drives each. Alternatively, a fewer number of ATA controllers may be used in conjunction with a switch that allows for more than two ATA type drives to be connected to each ATA controller port. Alternatively, drive array controller 204 may be one or more SCSI drive array controllers or any other type of drive array controller for controlling arrays of multiple disk drives. Drive array controller 204 and drive array 202 may be configured as a RAID drive array.

One or more CPU's 206 and system memory 208 may also be included within the single field replaceable unit 200. CPU's 206 may operate to export or present drive array 202 as one or more file systems through a network interface 210. The single field replaceable unit 200 may also include a power supply 214 and one or more fans 212. In one embodiment fans 212 may include a row of fans positioned between drive array 202 and one or more CPU's 206. Power supply 214 may be configured to supply power to CPU's 206, system memory 208, network interface 210, drive controller 204 and drive array 202. The power supply 214 is part of the single field replaceable unit and configured not to be individually field serviceable or field replaceable. In one embodiment, the entire single field replaceable unit 200 is configured to be rack mounted and has a height less than or equal to 1.75 inches. In another embodiment the height may be limited to only one inch.

Figure 2:
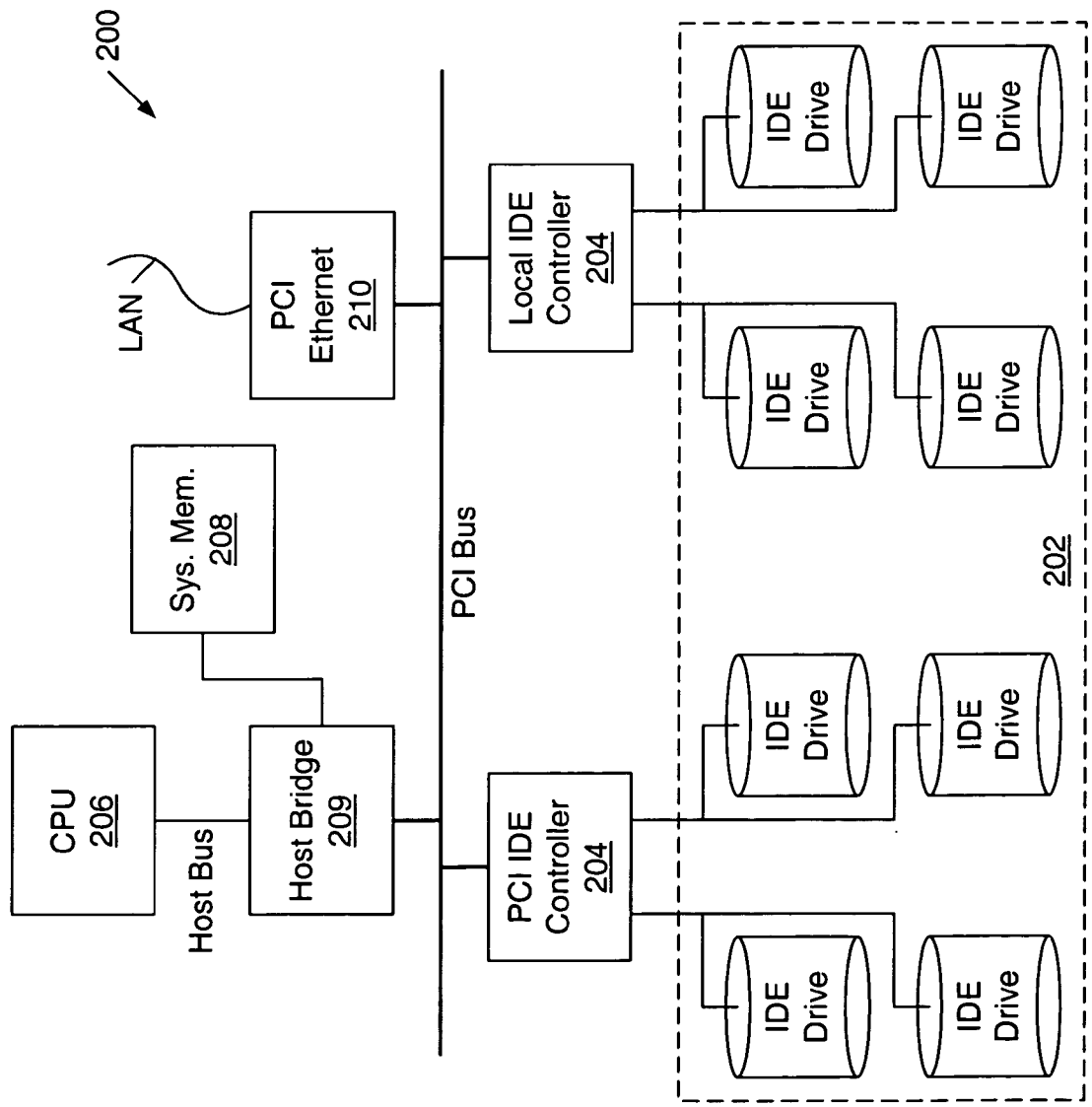
FIG. 2 is a block diagram of a storage or computer system that may be implemented as a single field replaceable unit, according to one embodiment.

FIG. 2 illustrates a field replaceable unit 200 according to one embodiment. The system includes one or more CPU's 206. In one embodiment, CPU's 206 may be one or more Sparc type processors. Alternatively, Pentium® type, Power PC® type or other types of processors may be employed. A host bridge 209 may be included to interface CPU's 206 to system memory 208 and an interconnect bus such as a PCI bus. A network interface 210 may be included to provide an interface to a network, such as a LAN. Drive controllers 204 are coupled to the interconnect bus and may be ATA/IDE type controllers in one embodiment. In the embodiment shown in FIG. 2, drive controllers 204 include four ATA/IDE controllers, each controlling two ATA/IDE drives so that drive array 202 includes eight ATA/IDE drives. In one embodiment, 34 gigabyte ATA/IDE drives are used so that the single field replaceable unit provides approximately 250 gigabytes of storage. ATA/IDE drives may be preferable for their lower cost and availability. However, other types of drives, such as SCSI, may be employed. Drive array 202 coupled to the one or more drive controllers 204 may be configured to be organized into one or more RAID logical volumes and exported or presented to client machines as one or more file systems through network interface 210. The processor 206, system memory 208, network interface 210, one or more drive controllers 204, and drive array 202 are packaged or assembled as a single field replaceable unit so that processor 206, system memory 208, network interface 210, one or more drive controllers 204, and the drives of drive array 202 are configured not to be individually field serviceable or field replaceable.

Software running on processor 206 exports or presents the disk storage 202 as an NFS (Network File System) or CIFS (Common Internet File System) file system to a network through network interface 210 so that the file system may be mounted by client machines connected to the network. In one implementation, the Solaris operating system is run using the DiskSuite software to organize the disk drives into RAID logical volumes. File systems are then built on these logical volumes and exported or presented to clients using either NFS (for Unix clients) or a program such as Samba (for exporting to Windows clients). In another embodiment, system 200 runs the Linux operating system internally using the Linux multi-device management software to configure RAID volumes. These volumes are exported or presented to clients in the same way as in the Solaris implementation.

Thus, a single field replaceable unit including all the components necessary to provide for a large RAID storage system is provided. The single field replaceable unit may include one or more processors, a network interface coupled to the processors, and an array of disk drives coupled to the processors and network interface. The array of disk drives may be configured to be provided as one or more file systems through the network interface. The processor network interface and array of disk drives are configured not to be individually field serviceable or field replaceable. Such a single field replaceable unit may be coupled to a network through the network interface so that one or more client machines may be coupled to the network and configured to access over the network the file systems provided by the single field replaceable unit. The number of physical disk drives of drive array 202 in a single field replaceable unit may be fixed so that disk drives may not be added or subtracted from the unit in the field.

A large amount of storage configured as one or more network file systems and as one or more RAID logical volumes, for example, may be provided as a single field replaceable unit. All components necessary to implement such a system including CPU, system memory, and network interface, necessary for exporting or presenting the file system to the network, the drive array controllers, and drive array itself are provided within the single field replaceable unit. In some embodiments, the single field replaceable unit is sealed so that the internal components are not readily accessible in the field. In some embodiments, these components are mounted or configured within the single field replaceable unit so as not to be individually field serviceable or field replaceable by a typical user. For example, the components may be fixed in the unit so that special tools are required for their removal. In other embodiments, the components may be physically arranged so that the means to remove them are not accessible without disassembling large portions of the unit. Various other techniques may be employed inhibit the field serviceability of the components.

The single field replaceable unit 200 may also include fans and a power supply which are also not field serviceable or replaceable. Thus, if a critical component of the system 200 fails, then the entire field replaceable unit is replaced for a new unit. In one embodiment, the field replaceable unit may include a data siphon port to facilitate the transfer of data from the drive array of the old unit to the new unit. By not supporting any field replacement and/or serviceability of internal parts, the system 200 may be designed much more densely than other storage systems that provide and equivalent amount of storage (e.g., at least a quarter of a terabyte of storage). The single field replaceable unit 200 also eliminates time spent having to trouble shoot individual components in the field. Instead, the entire unit is replaceable.

Figure 3:
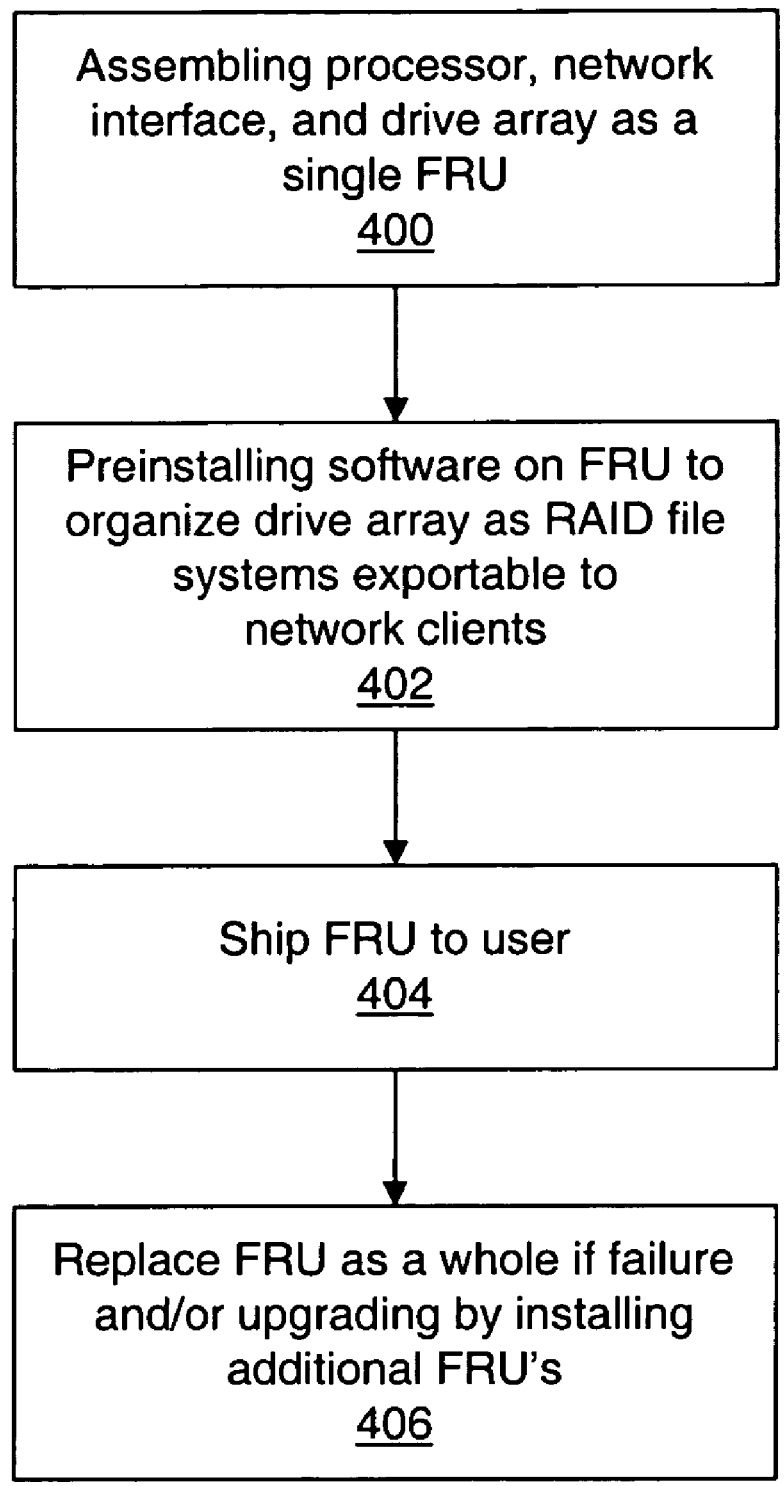
FIG. 3 is a flow diagram illustration of a method for providing a storage system as a single field replaceable unit, according to one embodiment.

Turning now to FIG. 3, a method is illustrated for providing a storage system as a single field replaceable unit, according to one embodiment. The method includes packaging or assembling the components of the storage system, such as one or more processors, a network interface, and a drive array, as a single field replaceable unit, as indicated at 400. The single field replaceable unit may have no field serviceable or replaceable internal parts. Software may be preinstalled at the manufacturer on the field replaceable unit to organize the drive array into one or more RAID logical volumes to be exported or presented to client machines as one or more file systems through the network interface. After assembling the components as a single field replaceable unit and preinstalling the RAID and file system software, the single field replaceable unit is shipped to a user, as indicated at 404. If a failure occurs, the entire field replaceable unit is replaced (e.g. by the manufacturer) as a whole, as indicated at 406. Also, since the single field replaceable unit cannot be individually upgraded by installing additional internal components, the user may upgrade by installing additional single field replaceable units.

Figure 4:
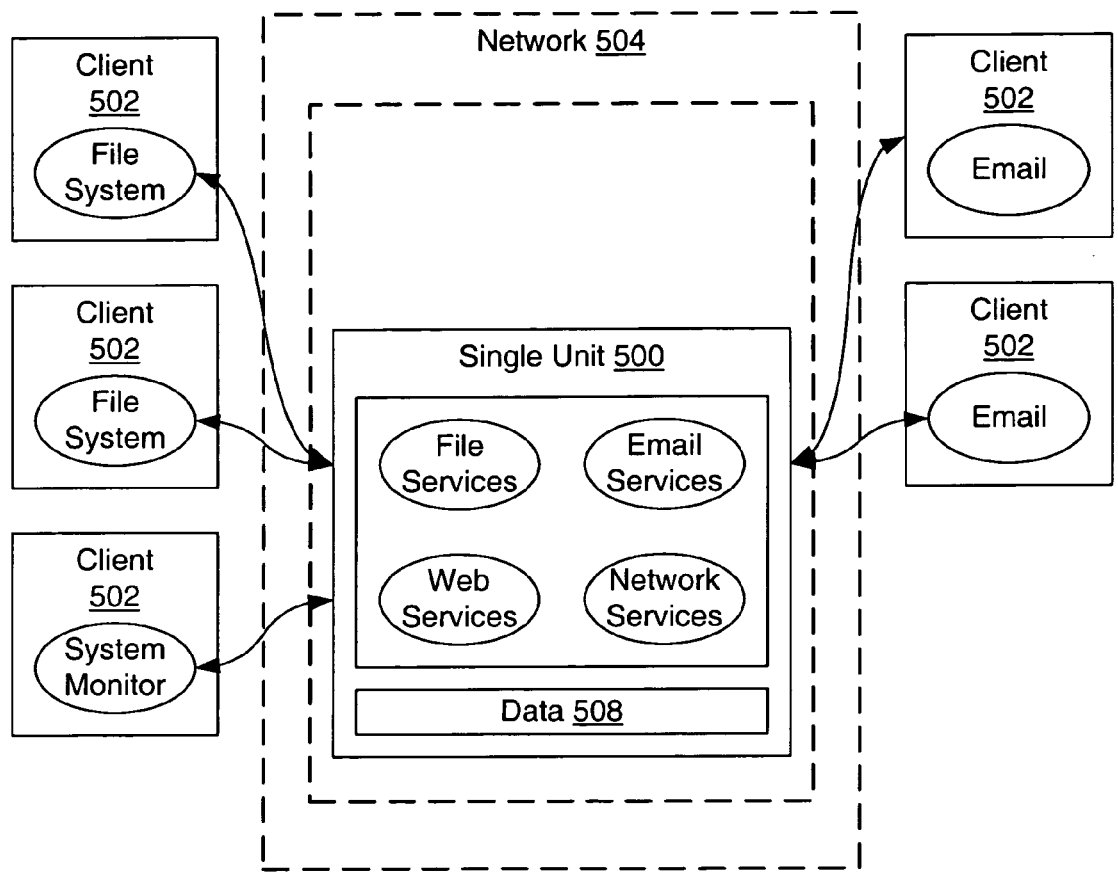
FIG. 4 is an illustration of a network system in which a single unit provides all of an office main compute services, according to one embodiment.

Turning now to FIG. 4, a network system is shown including one or more client computers 502 coupled to a network 504, according to one embodiment. The client machines 502 may be desktop PC's, workstations, terminal devices, etc., as may be found in typical office environments. The network 504 may be a local area network (LAN), for example, employing the Ethernet protocol. The client computers 502 obtain multiple office computing services from a single unit 500 also coupled to network 504. File services, email services, web services, and network services, for example, are all provided by the single unit 500. Thus, multiple or even all of an office's main computing services are provided by the single unit 500.

Single unit 500 includes a large amount of local storage 508. This local storage may be an array of disk drives configured to be supplied as one or more file systems to the clients 502 over network 504. The drive array may be configured as one or more logical RAID volumes. Single unit 500 performs file services, making the storage 508 accessible to client machines 502 over network 504. Single unit 500 also may perform network services for an office environment. Network services may include the issuance of IP (Internet Protocol) addresses for network clients. In one embodiment, IP addresses may be issued dynamically through Dynamic Host Configuration Protocol (DHCP) services. The single unit 500 may also operate a web service that serve pages from storage 508. Thus, single unit 500 may perform as a web server for an office in which web pages and other web related data are stored on storage 508. The web service provided by single unit 500 may also be the primary access point for administering single unit 500. The single unit 500 may also operate mail services over network 504 for the client machines 502. The software to implement the above described services may be preinstalled on the single unit 500 before shipping so that the end user may simply connect the single unit to its network to obtain many or all of the office computing services on a single unit. Thus, single unit 500 may be the central point for most or all main office computing services to client machines 502. Not all of the services illustrated in FIG. 4 may be required in all offices. Also, additional services beyond those illustrated may be provided by single unit 500.

Figure 5:
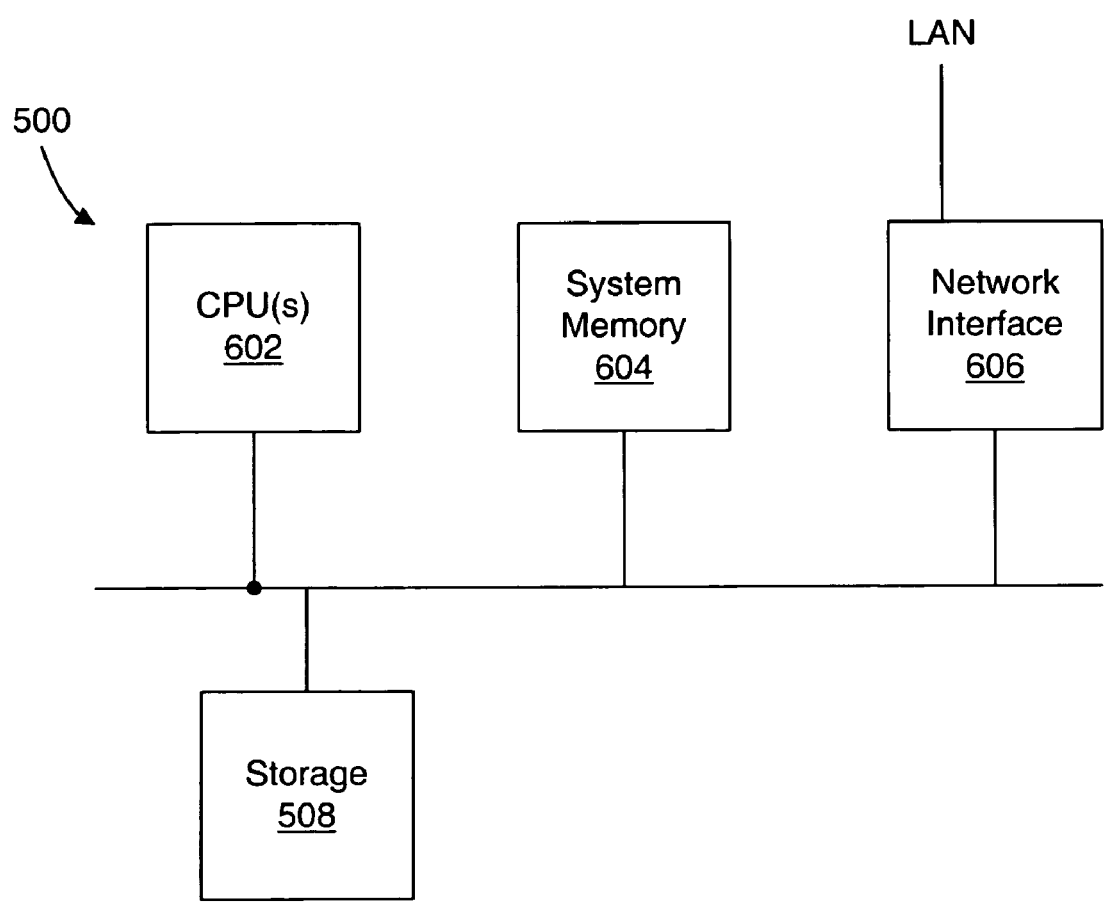
FIG. 5 is a simplified block diagram of components for a single unit that provides all of an office main compute services, according to one embodiment.

Turning now to FIG. 5, a simplified block diagram of components of the single unit 500 is illustrated. Single unit 500 may include one or more CPU's 202 coupled to system memory 604, data network 606, and mass storage 508. Software to implement various computer services, such as file services, email services, web services, and network services may be executed by CPU 602 from system memory 604 and storage 508. These services may be made available to client machines through network interface 606.

Thus, a single computer system may include a network connection 606 configured to be coupled to a network including a plurality of client machines. The single unit 500 also may include a mass storage array configured to be exported or presented to the client machines as one or more file systems through the network connection 606. One or more processors 602 may be included within the single unit 500 and coupled to network connection 606 and mass storage 508. The processors 602 are configured to execute a file server configured to make the one or more file systems available to the client machines through the network connection. Processors may also execute a network server configured to assign network addresses to the client machines, a web server configured to deliver web pages stored on mass storage 508 through the network connection 606, and an email server configured to provide email services for the client machines. The network connection 606, mass storage 508, one or more CPU's 602 configured to perform file server, network server, web server, and email server functions are all included within a single unit configured to be connected to a network through a network connection or interface.

Also included within single unit 500 may be a print server configured to be executed by CPU's 602 to provide printing services for the client machines. A data base server may also be included in the single unit 500 executed on CPU's 602 in order to provide access to a data base stored on storage 508 for the client machines. The one or more processor 602 may execute a multiprocessing operating system. The file server provided by single unit 500 may be configured to present the storage 508 as a NFS (Network File System) or CIFS (Common Internet File System) file system to the network through the network interface 606 so that the file system may be mounted by client machines. The file system may be configured to be accessible by Unix clients and/or Windows clients.

In one embodiment, mass storage 508 may include multiple ATA-type hard drives. Alternatively, SCSI or other types of hard drives may be employed. In one embodiment, single unit 500 providing file services, email services, web services, and network services is implemented as a single field replaceable unit, such as described in conjunction with FIGS. 1, 2, and 3.

Thus, a single system may be provided to provide many computer services required in an office as opposed to employing separate specialized systems for each computer service. For example, file services, web services, email services, and network services may all be preinstalled on a single unit and shipped to a customer so that the customer only has to connect the single system to a network in order to obtain the bulk of the computing services required for a small office. Instead of computing services being distributed across multiple machines, the services are preinstalled and centralized on a single unit. The single unit may be designed with multiple processors and employ a multiprocessing operating system so that sufficient performance is available to provide the plurality of computing services. Also, a large storage is included with the single unit 500 to provide ample space for file, web and email services. Other services, such as printer and database services may be included in the single unit as well. In some embodiments, the single unit may be a single field replaceable unit with limited field serviceable or field replaceable internal parts, as described above.

Figure 6A:
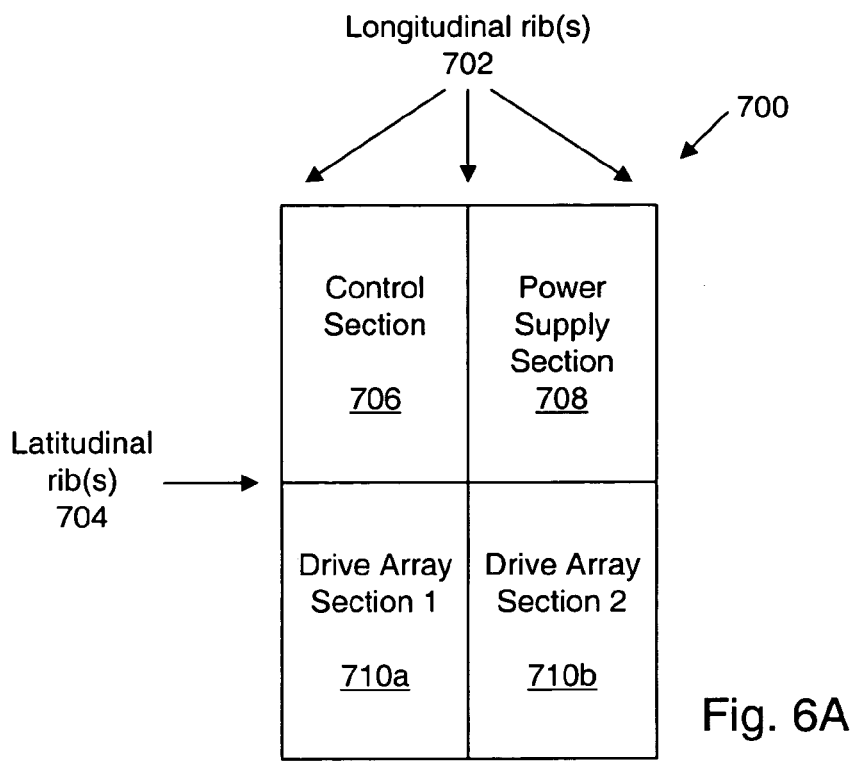
FIG. 6A illustrates a top view of a low profile substrate or tray for packaging a computer system, according to one embodiment.
Figure 6B:
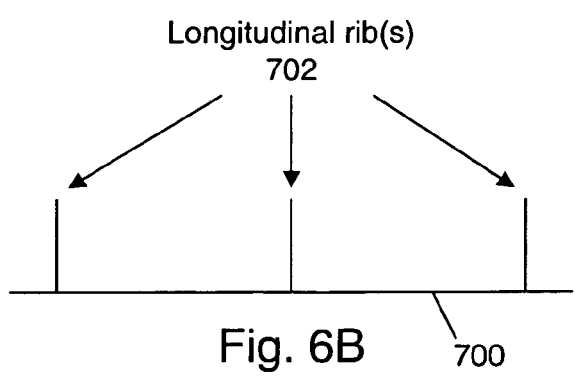
FIG. 6B illustrates a longitudinal side view of a low profile substrate or tray for packaging a computer system, according to one embodiment.
Figure 6C:
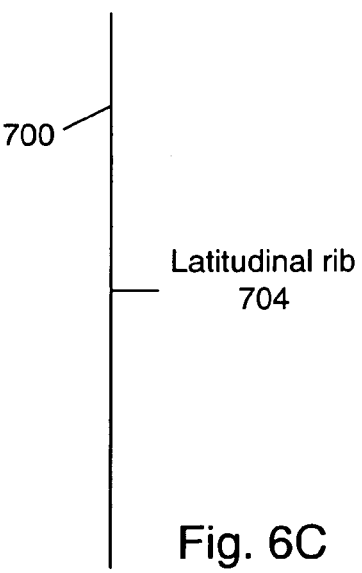
FIG. 6C illustrates a latitudinal side view of a low profile substrate or tray for packaging a computer system, according to one embodiment.

Turning now to FIGS. 6A–6C, a low profile substrate or tray for packaging a computer system is illustrated. A computer system packaged within the substrate or tray 700 may be a single field replaceable unit such as described in conjunction with FIGS. 1, 2, and 3, and/or maybe a single unit system including various office computing services, such as file services, web services, email services, and network services, such as described in conjunction with FIGS. 4 and 5. In a preferred embodiment the substrate 700 and the components mounted on substrate 700 have a maximum height of one inch. In one embodiment, the tray 700 is based on a 16 inch by 22 inch printed circuit board reinforced with ribs 702 and 704 in both x and y dimensions. The substrate 700 is populated with low profile components to implement a computer or storage system. The maximum height for one embodiment of the tray 700, including the PCB thickness, components and necessary clearance, is one inch. The structural ribs 702 and 704 may be oriented or configured to allow front to back air flow (e.g. latitudinal ribs may be perforated or broken) and to allow the tray 700 to be slid into a rack or cage independently (e.g. without interference) of other trays 700.

As shown in the top view of FIG. 6A, the computer system tray 700 includes a substrate, one or more longitudinal ribs 702, and one or more latitudinal ribs 704. The number of ribs shown in FIGS. 6A–6C is merely one example and other numbers of ribs may be employed. The ribs divide the substrate into multiple sections. One or more of the sections 710 are configured to hold a two-dimensional array of disk drives. Another section of the substrate, section 706, may be configured to hold circuitry for accessing and managing the two-dimensional array of disk drives. This circuitry may include one or more processors and/or disk array controllers. The substrate 700 includes at least one set of either longitudinal 702 or latitudinal 704 ribs positioned in the direction of a first axis of the substrate. This set of ribs separates the substrate into the different sections configured for holding the drive array and control circuitry. Another section 708 may be included and configured for holding one or more power supplies for supplying power to the drive array and control circuitry.

The substrate may be configured to be mounted in a cage or rack along with other such substrates. In one embodiment, the substrate 700 is configured to be mounted inside a standard 19 inch rack. An edge connector may be provided at the rear of the substrate to provide connectivity to a back plane that interconnects multiple such substrates and/or provides power to the substrates.

The substrate or tray 700 may include a power supply section 708. The tray 700 may receive power (e.g., through an edge connector) from a Telco-standard 48 volt DC supply. Local power regulation may be provided in power supply section 700 to convert the 48V DC signal to the voltages required by the components on the tray 700. Brick and half brick form factor integrated power supply modules (e.g., 0.5 inch×3 inch×5 inch) may be mounted in section 708 to provide the local regulation. The AMPSS modules (e.g., ALBOA, 240W) from ASTEC are examples of such modules. These modules provide a low profile solution.

Figure 6D:
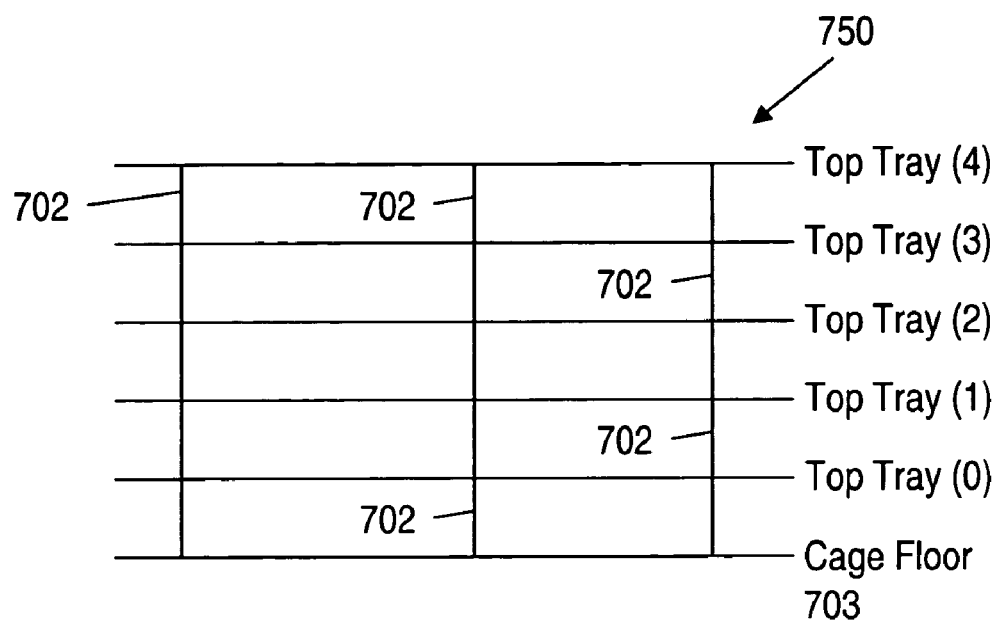
FIG. 6D is an illustration of how multiple trays 700 may be mounted on top of one another within a cage, according to one embodiment.

Turning now to FIG. 6D, an illustration of how multiple trays 700 may be mounted on top of one another within a cage 750 is illustrated. Trays may be mounted in the cage 750 similar to how trays are slid into a bakery rack. Slots may be grooved out in the internal sidewalls in the cage to accommodate the tray, or rails may be provided. Each tray 700 simply slides into the cage from the front and connects to a back plane at the rear of the cage via an edge connector. As described above, the back plane may provide electrical interconnect between the trays and may also provide power connections for the trays. In one embodiment the back plane provides a standard interconnect, such as the PCI bus or a high bandwidth variant of the PCI bus, or a switched interconnect fabric, such as that proposed by the Infiniband Trade Association.

To maximize space, in one embodiment each tray is not individually packaged inside its own metal case. The longitudinal and/or latitudinal ribs provide structural support so that the weight of the tray itself does not cause cracking or collapse once installed in the cage 750. The ribs provide enough strength such that the tray does not collapse under its own weight. To avoid sagging in the middle, components may be mounted on a PCB such that heavier components are distributed near ribs. Also, the ribs are designed to rest on top of one another when mounted in the cage. Dummy trays having ribs but no active components may be inserted in place of trays that are removed or uninstalled. The ribs may extend downward as shown in FIG. 6D to rest on the lower tray or cage floor. Alternatively, the ribs may protrude both above and below the substrate.

Figure 6E:
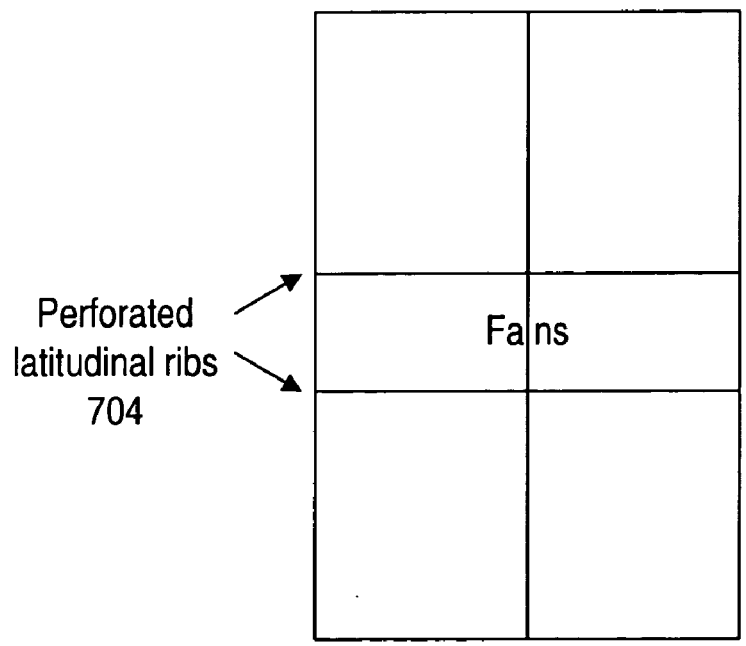
FIG. 6E illustrates a top view of a low profile substrate or tray for packaging a computer system including a row of fans, according to one embodiment.

In one embodiment, the tray 700 may include a row of fans across the tray, as shown in FIG. 6E for example. The fans may be situated between two latitudinal ribs, for example. In this embodiment the latitudinal ribs may be low profile ribs or may be perforated to allow airflow. In addition to, or instead of, providing small fans on the tray itself, the cage in which the trays are mounted may include a set of fans (e.g., 3.5 inch×3.5 inch fans). The cage fans may be located at the back of the cage. To facilitate front to back airflow, the cage back plane may be perforate or otherwise appropriately shaped.

Figure 7:
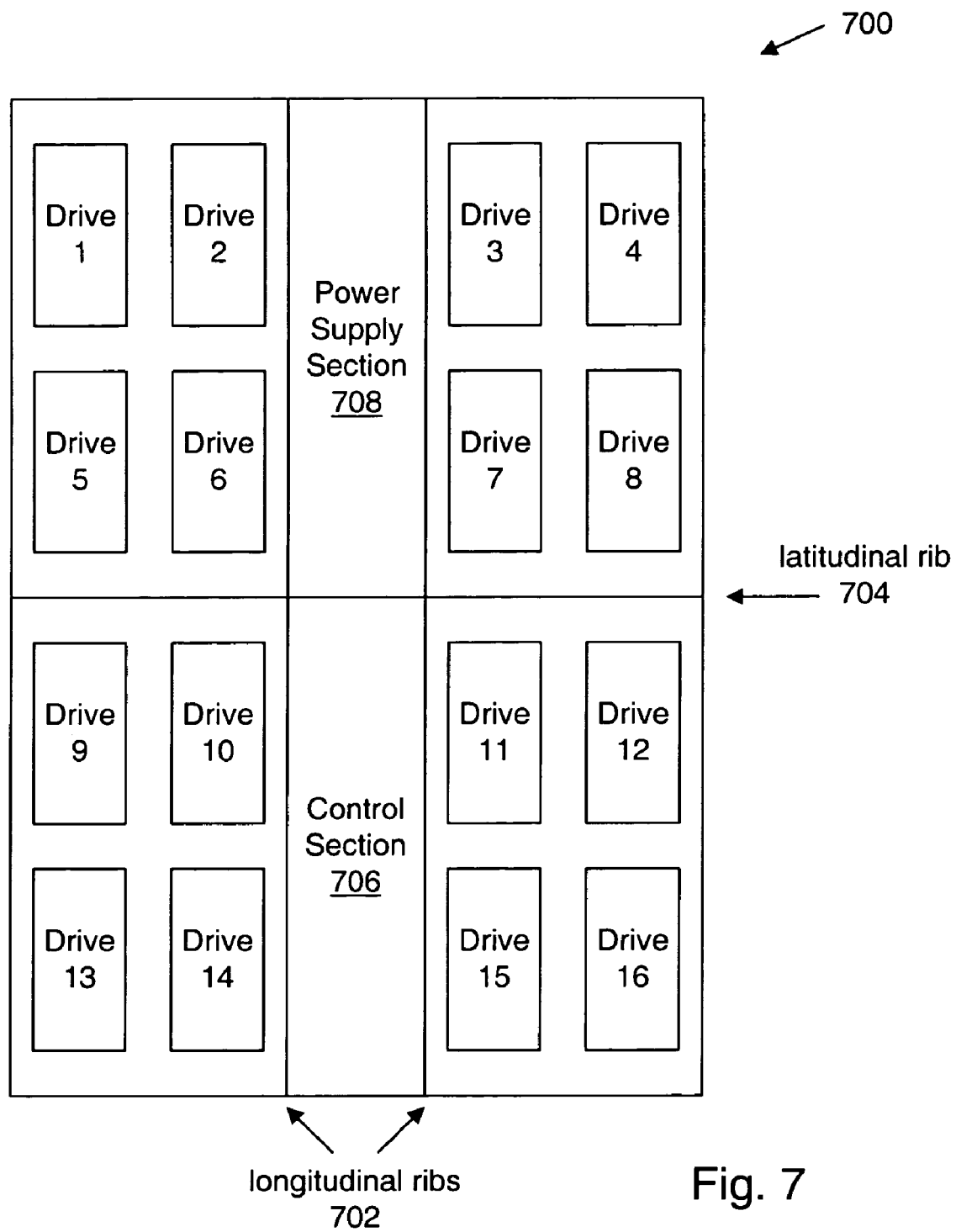
FIG. 7 illustrates a top view of another embodiment of a low profile substrate or tray for packaging a computer system.
Figure 8:
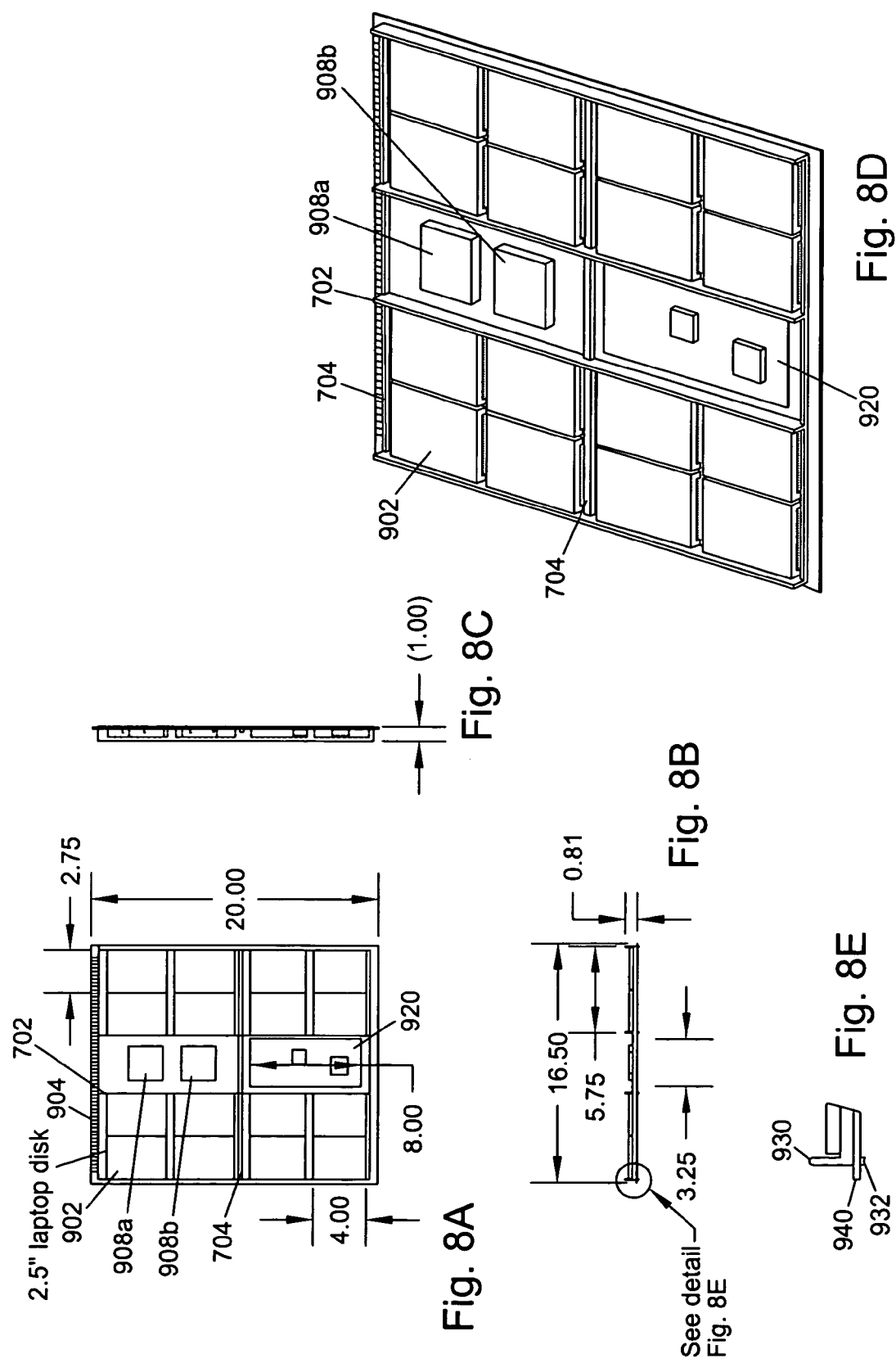
FIG. 8A illustrates a top view of another embodiment of a low profile substrate or tray for packaging a computer system.
FIG. 8B illustrates a longitudinal side view of another embodiment of a low profile substrate or tray for packaging a computer system.
FIG. 8C illustrates a latitudinal side view of another embodiment of a low profile substrate or tray for packaging a computer system.
FIG. 8D illustrates a perspective view of another embodiment of a low profile substrate or tray for packaging a computer system.
FIG. 8E illustrates a detail section of a corner of a substrate or tray for packaging a computer system, according to one embodiment.

Turning now to FIG. 7, another example of a tray 700 is shown. The tray includes a two-dimensional array of disk drives (drives 1–16) mounted on a substrate. The two-dimensional array of disk drives extends across the substrate along a first (e.g. latitudinal) and second (e.g. longitudinal) axis of the substrate. Circuitry for controlling or managing the two-dimensional array drives is also mounted to the substrate. The control circuitry may include one or more processors, drive controllers, and drive interconnect components. A first plurality of ribs (e.g., longitudinal ribs 702) are positioned in the direction of the first axis and separate the control circuitry from the array of disk drives.

To provide for a low profile and low power design, hard drives designed for laptop computers may be used for the drives of the two-dimensional array of disk drives. These are typically 2.5 inch disk drives with a 0.7 inch height which do not give out much heat and thus facilitate a high-density design. The embodiment of FIG. 7 shows eight disk drives mounted on each of a left and right region. This prevents the substrate from sagging in the middle section. In some embodiments the tray may be further divided by one or more latitudinal ribs 704. The latitudinal ribs may be lower profile ribs or may be perforated to allow for front to back airflow. A latitudinal rib may divide the middle section into a front and back section. The front section may include control circuitry and the rear section may include power supplies. The ribs may be metal ribs and may be fashioned to serve as electromagnetic barriers and/or heat sinks for the power supplies. The power supply section may also include a backup battery as well.

In one embodiment, three trays, such as illustrated in FIG. 7, may be mounted in a single cage or enclosure. Each tray may include sixteen 2.5 inch laptop disk drives (having a height of 0.7 inches) for a total of 48 drives providing one terabyte of storage plus 200 gigabytes of hot spare storage, for example. Alternatively, standard 3.5 inch desktop disk drives may be used. The substrate may be designed so that each desktop disk drive occupies the space allotted for two of the smaller 2.5 inch disk drives. This alternate design requires no changes to the substrate except for possibly the addition of a flexible cable to connect 3.5 inch drives to the 2.5 inch drive connector on the substrate. The cage or enclosure may be designed to accept either two trays using the taller 3.5 inch drives or three trays using the lower profile 2.5 inch drives. Each substrate, or alternatively the entire enclosure, may be packaged as a single field replaceable unit as described in regard to FIGS. 1, 2, and 3. Also, multiple office computing servers may be installed on a substrate as described in conjunction with FIGS. 4 and 5.

Turning now to FIGS. 8A–8E, a somewhat more detailed example of a substrate for mounting an array of drives and control circuitry is illustrated. Note that the specific configuration of components and the dimensions shown in FIGS. 8A–8E are merely given as examples. Other dimensions and component placements may be employed in other embodiments.

FIG. 8A shows a top view of the substrate. One or more longitudinal ribs 702 and one or more latitudinal ribs 704 separate the substrate into multiple sections. Drives 902 are mounted in one or more of the sections to form an array of disk drives. Another section is configured for control circuitry, such as shown on controller board 920. The controller board may include one or more CPU's and drive controllers. In one embodiment, the drives 902 are ATA-type drives and controller board 920 includes an ATA switch device to allow more than two ATA type drives to be connected to each ATA port of an ATA controller. See co-pending U.S. application Ser. No. 09/624,557, entitled "Switch for Selectively Forming a Communication Channel Between a Processing Unit and Multiple Devices, and Associated Data Exchange Methods", filed Jul. 25, 2000, inventor Whay S. Lee, which is hereby incorporated by reference in its entirety, for a description of such an ATA switch device. Another section of the substrate is configured to hold one or more power supplies 908. The power supplies provide the required voltages for the disk drives and control circuitry. In one embodiment, the power supplies convert from a 48-volt DC power signal provided to the substrate on edge connector 904. Edge connector 904 may include redundant power supply tracks wherein the two illustrated power supplies 908a and 908b are redundant power supplies so that if one supply fails or if the power supply connection to the edge connector for one power track fails, power will still be available on the redundant track or supply. Alternatively, or additionally, the power supplies may include a memory battery backup power supply.

FIG. 8B and FIG. 8C show side views of the substrate in the longitudinal and latitudinal directions respectively. FIG. 8D shows a perspective view of the substrate. Turning now to FIG. 8E, a detail section of a corner of the substrate is illustrated. As shown in FIG. 8E, the longitudinal ribs may include a top portion 930 and a bottom portion 932. The bottom portion 932 may be configured to mate with a corresponding top portion 930 of a lower tray when the trays are mounted in a cage or enclosure. Thus, the longitudinal ribs and/or latitudinal ribs of each tray may be configured to rest upon ribs of a lower tray when mounted in a cage. Also, the substrate may include protrusions 940 along the longitudinal edges for sliding into grooves or rails in the internal sidewalls of a cage, rack or other enclosure. Thus, the trays may be slid into a cage to form a vertical stack of trays resting upon each other's ribs. If one tray is removed, a dummy tray may be inserted to provide rib support so that the trays do not have to be reconfigured within the cage.

The cage may include a back plane with connectors for edge connectors on each tray. The back plane may provide I/O and/or network connectivity. In one embodiment the back plane provides a switched, point-to-point I/O interconnect fabric for the trays. The cage may be configured with slots or rails to accept trays of different height form factors, such as 1.75 inch trays and 1 inch trays.

Figure 9:
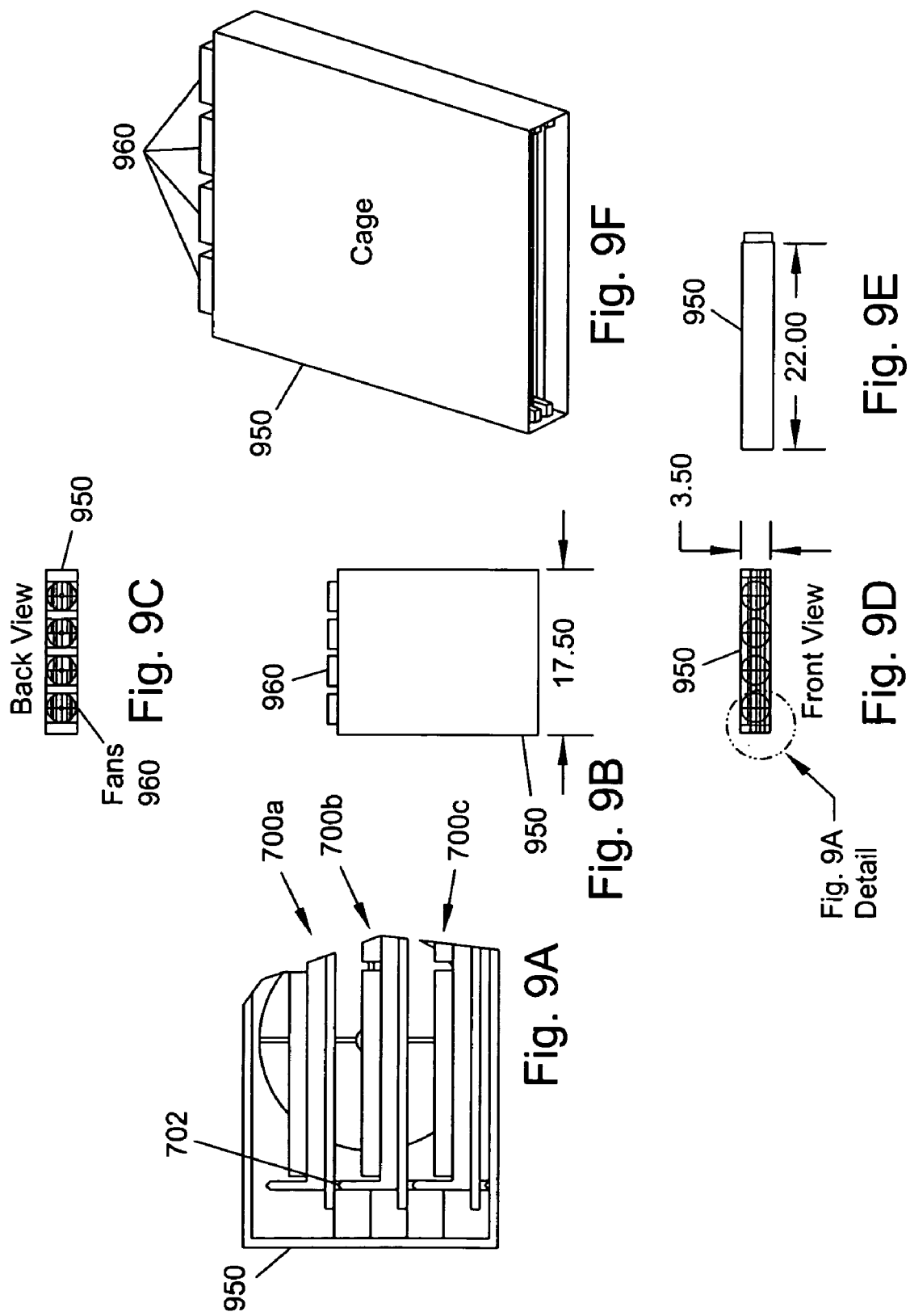
FIG. 9A illustrates a partial frontal view of a cage or enclosure for mounting multiple low profile substrates or trays for packaging a computer or storage system(s), according to one embodiment.
FIG. 9B illustrates a top view of a cage or enclosure for mounting multiple low profile substrates or trays for packaging a computer or storage system(s), according to one embodiment.
FIG. 9C illustrates a rear view of a cage or enclosure for mounting multiple low profile substrates or trays for packaging a computer or storage system(s), according to one embodiment.
FIG. 9D illustrates a front view of a cage or enclosure for mounting multiple low profile substrates or trays for packaging a computer or storage system(s), according to one embodiment.
FIG. 9E illustrates a side view of a cage or enclosure for mounting multiple low profile substrates or trays for packaging a computer or storage system(s), according to one embodiment.
FIG. 9F illustrates a perspective view of a cage or enclosure for mounting multiple low profile substrates or trays for packaging a computer or storage system(s), according to one embodiment.

Turning now to FIGS. 9A–9F, an example of such a cage or enclosure 950 is illustrated in various views. FIG. 9A illustrates three trays 700a–c mounted in a single cage 950. FIG. 9A also illustrates how each tray 700 may rest upon the ribs 702 of a lower tray or upon the floor of the cage. As shown in FIG. 9B, the cage 950 may include multiple fans 960 at the rear of the cage. The fans 960 are configured to provide cooling for all of the trays 700 mounted in the cage 950. In one embodiment the fans 960 are behind the cage back plane and the cage back plane is perforated or otherwise shaped to allow front to back airflow through the cage. FIG. 9C shows a back view of the cage 950 showing multiple fans 960, and FIG. 9D shows a front view of the cage 950 showing three trays mounted within the cage with the fans at the rear, as detailed in FIG. 9A. FIG. 9E is a side view of the cage and FIG. 9F is a perspective view of the cage.

Figure 10:
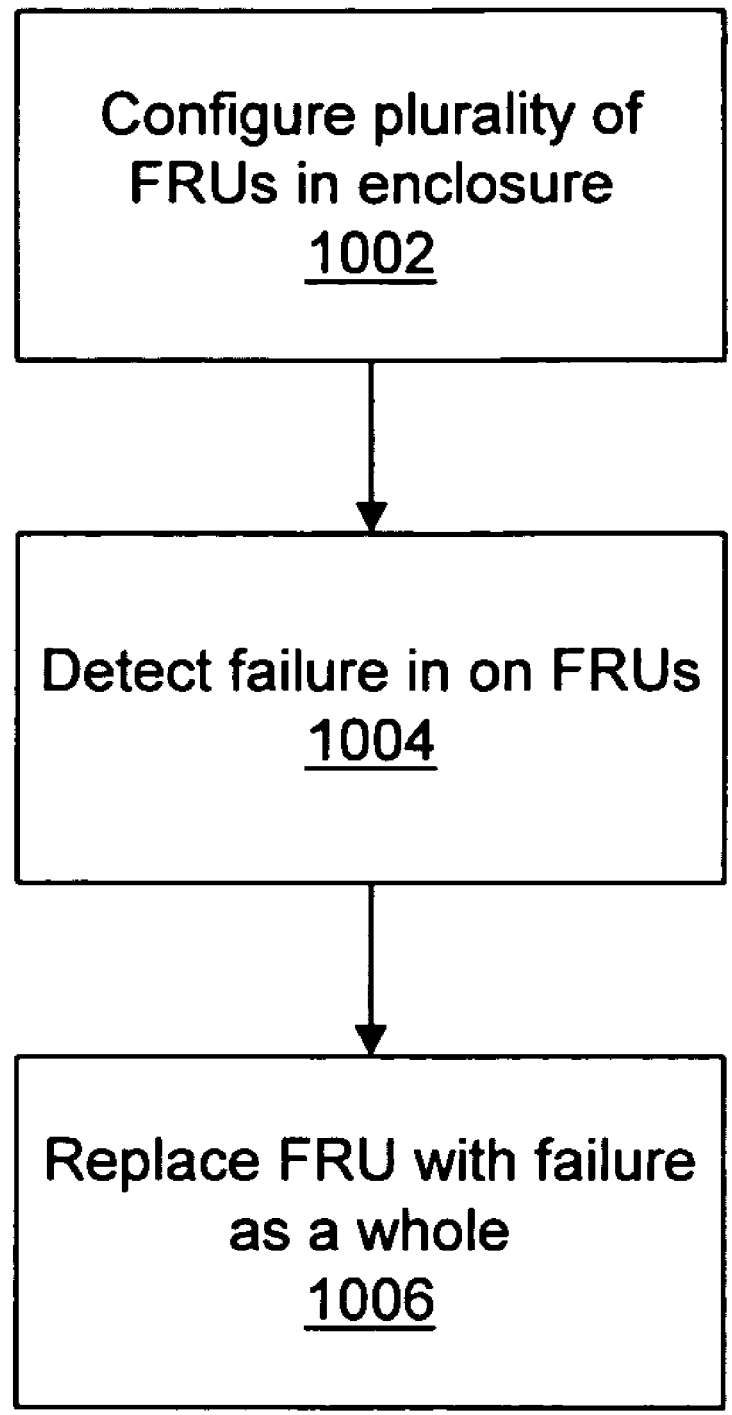
FIG. 10 illustrates a method for replacing a field replaceable unit having a failure, according to one embodiment.

Each of the trays as described in FIGS. 6A–9F may be a single field replaceable unit as described in regard to FIGS. 1–3. FIG. 10 illustrates a method in which a user configures a plurality of field replaceable storage units in an enclosure, as indicated at 1002. The enclosure may be a cage, rack, etc. Each field replaceable storage unit includes an array of hard drives and is configured to make the hard drives available on a network. A failure may be detected in one of the field replaceable storage units, as indicated at 1004. The failure may be a hard drive failure, power supply failure, processor failure, or any other failure that renders the unit wholly or partially inoperable. Instead of field servicing the failed unit to determine the failed component(s) and replacing the failed component(s) in the field, the user replaces filed replaceable unit as a whole, as indicated at 1006.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A single field replaceable unit, comprising:
   a processor;
   a system memory coupled to said processor;
   a network interface for connecting to a network;
   one or more drive controllers coupled to the processor; and
   an array of disk drives coupled to said one or more drive controllers and configured to be organized into one or more RAID logical volumes and presented to client machines as one or more filesystems through said network interface;
   wherein said processor, said system memory, said network interface, said one or more drive controllers, and said array of disk drives are packaged as a single field replaceable unit (FRU) so that said processor, said system memory, said network interface, said one or more drive controllers, and said array of disk drives are configured not to be individually field serviceable or field replaceable.

2. The unit as recited in claim 1, further comprising a motherboard, wherein said processor, said system memory, said network interface, said one or more drive controllers, and said array of disk drives are attached to said motherboard so as not to be field removable.

3. The unit as recited in claim 1, further comprising one or more fans configured to flow air over said array of disk drives and said processor, wherein said one or more fans are packaged as part of said single field replaceable unit and are configured not to be individually field serviceable or field replaceable.

4. The unit as recited in claim 3, wherein said one or more fans comprises a row of fans positioned between said array of disk drives and said processor.

5. The unit as recited in claim 1, wherein said one or more drive controllers comprise four ATA-type drive interfaces, and wherein said array of disk drives comprises eight ATA-type disk drives.

6. The unit as recited in claim 1, wherein said array of disk drives are configured to provide storage for at least a quarter of a terabyte of data in said single field replaceable unit.

7. The unit as recited in claim 1, further comprising a power supply configured to supply power to said processor, said system memory, said network interface, said one or more drive controllers, and said array of disk drives, wherein said power supply is part of said single field replaceable unit and is configured not to be individually field serviceable or field replaceable.

8. The unit as recited in claim 1, wherein said processor is configured to execute a UNIX-type operating system and present said array of disk drives as a Network File System (NFS) or Common Internet File System (CIFS) filesystem to a network through said network interface so that the filesystem can be mounted by client machines.

9. The unit as recited in claim 8, wherein the filesystem is configured to be accessible by UNIX clients or Windows clients.

10. The unit as recited in claim 1, wherein said processor is configured to execute a Linux-type operating system and present said array of disk drives as a Network File System (NFS) or Common Internet File System (CIFS) filesystem to a network through said network interface so that the filesystem can be mounted by client machines.

11. The unit as recited in claim 10, wherein the filesystem is configured to be accessible by UNIX clients or Windows clients.

12. The unit as recited in claim 1, wherein said single field replaceable unit is configured to provide office network services including issuing IP addresses to client machines, web page server services, and electronic mail services for client machines through said network interface.

13. The unit as recited in claim 1, wherein the number of physical disk drives of said array of disk drives is fixed in said single field replaceable unit so that additional physical disk drives cannot be added to said single field replaceable unit in the field.

14. The unit as recited in claim 1, wherein said single field replaceable unit is configured to be rack-mounted and has a height less than or equal to 1.75 inches.

15. A system, comprising:
   a single field replaceable unit (FRU) comprising:
      one or more processors;
      a network interface coupled to said one or more processors; and
      an array of disk drives coupled to said one or more processors and said network interface, wherein said array of disk drives is configured to be provided as one or more filesystems through said network interface;
      wherein said processor, said network interface, and said array of disk drives are configured not to be individually field serviceable or field replaceable;
   a network coupled to said network interface of said single field replaceable unit; and
   one or more client machines coupled to said network and configured to access over said network said one or more filesystems provided by said array of disk drives within said single field replaceable unit.

16. The system as recited in claim 15, wherein said array of disk drives within said single field replaceable unit are configured into RAID logical volumes.

17. The system as recited in claim 15, wherein said array of disk drives within said single field replaceable unit are ATA-type disk drives.

18. The system as recited in claim 15, wherein said single field replaceable unit is configured to provide storage for at least a quarter of a terabyte of data.

19. The system as recited in claim 15, wherein said single field replaceable unit is configured to provide office network services including issuing IP addresses to said client machines, web page server services, and electronic mail services for said client machines over said network.

20. The system as recited in claim 15, wherein the number of physical disk drives of said array of disk drives is fixed in said single field replaceable unit so that additional disk drives cannot be added to said single field replaceable unit in the field.

21. The system as recited in claim 15 comprising a storage rack having multiple ones of said single field replaceable unit coupled together over said network.

22. A method for providing computing resources, comprising:
   assembling a processor, network interface and array of disk drives as a single field replaceable unit (FRU) so that said processor, said network interface, and said array of disk drives are configured not to be individually field serviceable or field replaceable, and wherein said processor, said network interface, and said array of disk drives are configured to provide one or more filesystems to client machines through said network interface;

preinstalling software on said single field replaceable unit configurable to organize said array of disk drives into one or more RAID logical volumes to be presented to client machines as one or more filesystems through said network interface;

after said assembling and said preinstalling, shipping said single field replaceable unit to a user; and replacing said single field replaceable unit as a whole upon failure, wherein said single field replaceable unit has no serviceable internal parts.

23. The method as recited in claim 22, wherein the storage capacity of said single field replaceable unit is not individually upgradeable, the method further comprising upgrading the computer resources by the user installing one or more additional ones of said single field replaceable unit.

24. A method for providing computing resources, comprising:

configuring a plurality of field replaceable storage units in an enclosure, wherein each field replaceable storage unit comprises an array of hard drives and is configured to make the hard drives available on a network;

detecting a failure in one of the field replaceable storage units; and replacing as a whole the field replaceable storage unit having the failure.

25. The method as recited in claim 24, further comprising expanding the computing resources by adding one or more additional field replaceable storage units to the enclosure, wherein each additional field replaceable storage unit comprises an array of hard drives and is configured to make the hard drives available on the network.

26. The method as recited in claim 24, wherein the array of hard drives within each field replaceable storage unit is configured into RAID logical volumes.

27. The method as recited in claim 24, wherein the array of hard drives within each field replaceable storage unit are ATA-type disk drives.

28. The method as recited in claim 24, wherein each field replaceable storage unit is configured to provide storage for at least a quarter of a terabyte of data.

29. The method as recited in claim 24, wherein the number of hard drives of each array of hard drives is fixed in each field replaceable storage unit so that additional hard drives cannot be added to individual field replaceable units in the field.

30. A system, comprising:

an enclosure configured to hold a plurality of individual field replaceable storage units, wherein each individual field replaceable storage unit comprises:

one or more processors; and an array of disk drives coupled to said one or more processors, wherein said processor and said array of disk drives are configured to provide one or more filesystems to a network;

wherein said enclosure is configured so that each individual field replaceable storage unit is individually removable or insertable, wherein each individual field replaceable storage unit is configured so that said one or more processors and said array of disk drives are configured not to be individually field serviceable or field replaceable so that failed one of said individual field replaceable storage units are replaced in said enclosure as a whole.

31. A field replaceable unit, comprising:

a processor;

a system memory coupled to said processor;

a network interface for connecting to a network;

one or more drive controllers coupled to the processor; and an array of disk drives coupled to said one or more drive controllers and configured to be organized into one or more RAID logical volumes and presented to client machines as one or more filesystems through said network interface;

wherein said processor, said system memory, said network interface, said one or more drive controllers, and said array of disk drives are packaged as a field replaceable unit (FRU), wherein said field replaceable unit is sealed to prevent said processor, said system memory, said network interface, said one or more drive controllers, and said array of disk drives from being separately field replaceable.

* * * * *